United States Patent [19]

Georgi

[11] E Re. 29,495

[45] Reissued Dec. 13, 1977

[54] APPARATUS AND METHOD FOR A METERING SYSTEM

[75] Inventor: Donald K. Georgi, Minneapolis, Minn.

[73] Assignee: Graco Inc., Minneapolis, Minn.

[21] Appl. No.: 609,916

[22] Filed: Oct. 1, 1975

Related U.S. Patent Documents

Reissue of:

[64] Patent No.: 3,756,456
Issued: Sept. 4, 1973
Appl. No.: 255,478
Filed: May 22, 1972

[51] Int. Cl.[2] ..... B67B 7/00

[52] U.S. Cl. ..... 222/1; 222/14

[58] Field of Search ..... 222/1, 14–22, 222/309, 71, 70; 318/632; 417/12

[56] References Cited

U.S. PATENT DOCUMENTS

| | | | |
|---|---|---|---|
| 2,759,633 | 8/1956 | Ross | 222/16 |
| 3,092,029 | 6/1963 | Hanson et al. | 222/71 |
| 3,254,795 | 6/1966 | Mackie | 222/20 |
| 3,278,082 | 10/1966 | Thielen et al. | 222/20 |
| 3,396,870 | 8/1968 | Diamond et al. | 222/14 |
| 3,491,369 | 1/1970 | Debbrecht | 222/309 |
| 3,523,627 | 8/1970 | Crozier | 222/20 |
| 3,598,283 | 8/1971 | Krutz | 222/14 |
| 3,651,989 | 3/1972 | Westrich | 222/17 X |
| 3,666,141 | 5/1972 | Ma et al. | 222/1 |
| 3,668,501 | 6/1972 | Chitayat | 318/632 |
| 3,743,140 | 7/1973 | Sauerbrey | 222/70 X |
| 3,887,110 | 6/1975 | Porter | 222/16 |

*Primary Examiner*—Robert B. Reeves
*Assistant Examiner*—Joseph J. Rolla
*Attorney, Agent, or Firm*—Paul L. Sjoquist

[57] ABSTRACT

An apparatus and method for a fluid metering system that employs a high resolution position sensor and electronics to very accurately control the amount of fluid dispensed. This sensor may be an optical sensor which translates the movement of a positive displacement pump into electrical signal pulses that are serially fed into a counter which converts them to parallel binary or binary-coded decimal form. The optical sensor uses a light-sensitive transducer to convert light rays to electrical pulses, a light source, and two graticule frames therebetween. One graticule frame moves relative to the other graticule. Each of the graticules has a large number of equally-spaced light-transmitting areas. Preset counts in the counter compensate for time lags in the system operation such as the lag due to the movement of the dispensing valve and the solenoid valve in an actuating piston. These preset counts are added to the serial counts from the sensor, and then an electrical signal from the counter is sent to a comparator which compares the sum with a programmable number. This programmable number directly relates to the amount of fluid it is desired to dispense. When it and the sum from the counter are equal, the comparator sends a second signal to actuate the solenoid valve which results in the fluid flow being stopped. The programmable number may be manually inputted or may be determined by any measurable characteristic of an object, like its weight, or any fixed relationship relating to the object, for example, a percentage of its weight. In a modification to the basic system, provision is also made to control the position of the object fluid is being dispensed into relative to the dispenser. Positioning is obtained by utilizing a control circuit and an hydraulic-linear actuator to move the object. This latter operation may be positionally controlled by a signal directly proportional to the object's weight, for example, the weight of a fowl that is being injected with a fluid additive.

28 Claims, 5 Drawing Figures

(PULSE DIAGRAM)

APPARATUS AND METHOD FOR A METERING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

Generally, this invention relates to a pumping system with electronic controls and its method of operation to accurately meter a desired quantity of fluid into an object. In particular, it is concerned with a fluid metering system and its method of operation that utilizes a sensor to detect the piston movement of a positive displacement pump and to control the amount of fluid pumped and dispensed by comparing an electrical modified signal from the sensor with a programmed electrical signal.

2. Description of the Prior Art

Metering systems that use electronic controls to meter the flow of fluids are known. In addition, dispensing and metering systems that sense the movement of a positive displacement pump piston and send electronic data based thereon to dispense a desired amount of fluid are also known. In none of the known prior art systems is a high resolution sensor used to sense very small incremental piston movements combined with an electronic circuit that has a counter and comparator network that compensates for time delays due to mechanical movements within the system itself. The degree of sophistication and high resolution in my fluid metering system heretofore unknown, results in a very high degree of accuracy and control in the amount of fluid a person desires to dispense.

SUMMARY OF THE INVENTION

The fluid metering system of this invention and its method of use combines a positive displacement pump with control circuitry to actuate a valve and dispense a predetermined amount of fluid. The control circuitry is combined with a high resolution sensor that reads and signals incremental piston movements of the pump. This signal is then totalled and added to an error-compensating value in a counter. Their sum is fed into a comparator where it is compared with a signal representing the amount of fluid it is desired to dispense. When the two values are equal, a valve in a dispensing device is deactuated. This deactuation stops the pumping stroke of a hydraulic linear actuator and results in the actuation of a second valve in the dispenser to cut off fluid flow to precisely dispense the metered amount of fluid.

A primary object of this invention is an improved high resolution fluid metering system and its method of operation.

An additional object is a fluid metering system that precisely meters a desired volume of fluid by compensating for errors inherent in the system operation.

Still another object is to use the weight or other measurable characteristic of whatever is being filled with the fluid, to control the input signal of a comparator and thereby control the amount of fluid dispensed and also the position of the object relative to the dispenser.

Figure 1:
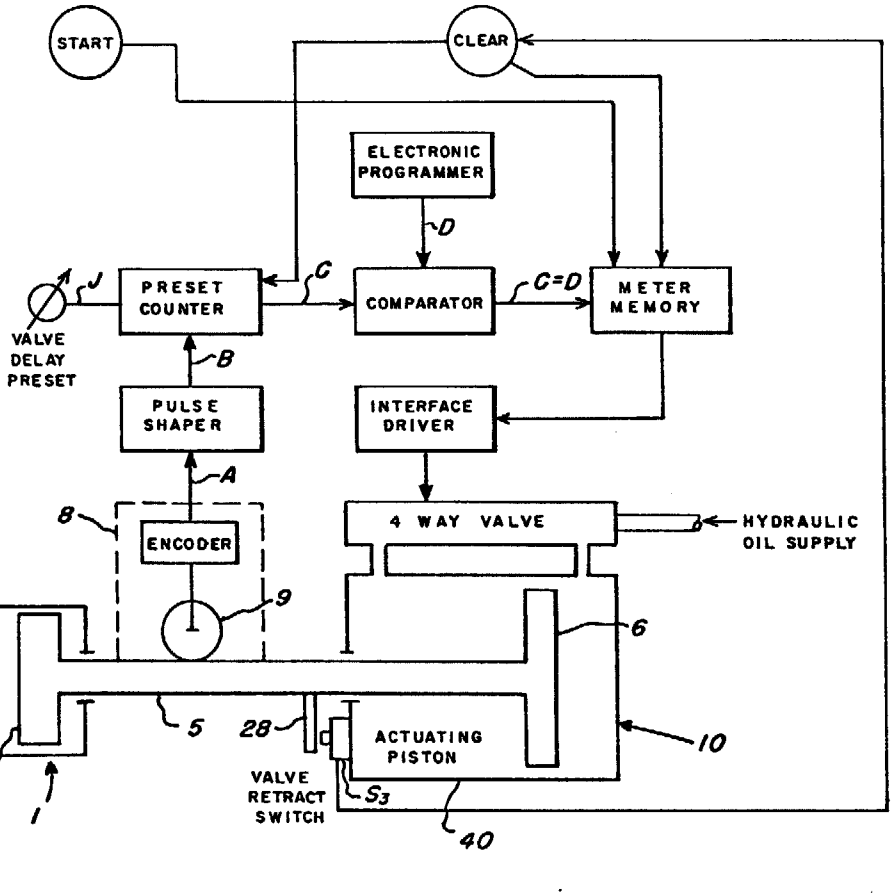
FIG. 1 shows a schematic view of the preferred embodiment of my metering system.

In FIG. 1, a positive displacement pump 1 forces fluid under pressure from a reservoir 2 to a dispensing device 3. This dispenser has a normally closed spring-biased valve 4 that is opened by fluid under pressure as piston rod 5 moves to the left. Hydraulic fluid under pressure actuates the right side of piston 6 in linear actuator 10 to move the piston rod to cause pump 1 to dispense fluid. The actuating piston 6 is, in turn, controlled by an electrically-operated solenoid four-way valve.

It is important to note that my invention is not limited to the specific single acting type of positive displacement pump shown. For purposes of my invention, a positive displacement pump encompasses every type of pump in which a constant volume of fluid material is pumped independent of the particular fluid viscosity, pressure, or material when the actuating means or piston moves through a complete pumping cycle. Thus, when the piston 7 in the metering pump 1 moves from its right-most position to its left-most position, in the direction of the arrow, a constant volume of fluid is dispensed from the dispenser 3 for each incremental movement of rod 5. Besides the single acting pump of FIG. 1, that dispenses fluid only on half the cycle as piston rod 5 moves to the left, double-acting diaphragm, bellows, gear, rotary piston, as well as most linear reciprocating types of pumps, can be considered positive dislacement pumps as the term is used herein.

As the piston rod 5 moves to the left to pump fluid, a wheel 9 frictionally engaged therewith rides on the rod and rotates. The linear movement of the piston rod is thus converted to rotary motion by wheel 9. Wheel 9 and the shaft encoder from the sensor 8 designated as a rectangular dotted line box in FIG. 1. The shaft encoder (or encoder for short) is of a type such as the commercially available Model DRC-77 type made by the Dynamics Research Corporation, Stoneham, Massachusetts. It's function is to act as a transducer to transform the very small linear incremental movements of the piston rod into electrical serial pulses. The sensor has been characterized as a high resolution sensor since it is able to sense piston movements between 0.1 inch to 0.0001 of an inch without contributing erroneous frictional, hysteresis, backlash, or inertial effects to the result obtained. It is not necessarily limited to optical sensors but conceivably could be magnetically or electrically actuated.

Figure 4:
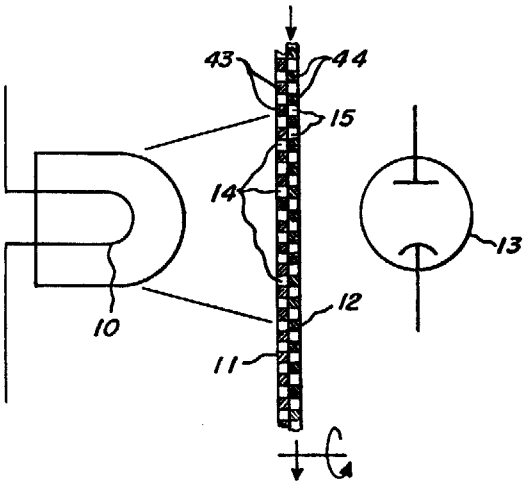
FIG. 4 is enlarged interior view of part of the sensor of FIG. 1.

The optical encoder is shown in part by the simplified enlarged diagram of FIG. 4. It consists of four basic elements, namely: the light source 10, the circular [srationary] *stationary* graticule 11, the rotatable circular graticule 12, and the transducer 13 that converts light rays into electrical pulses. Graticule 12 acts as a digital position sensor and is in the same shaft as wheel 9 and rotates in unison therewith. Both of the graticules have a large number of equal-width radial black lines with alternate clear areas therebetween that are spaced in the same width apart as the black lines for a given distance from the graticule's center. Numbers 14 and 15 in FIG.

4 indicate the clear areas for graticules 11 and 12, respectively. These clear areas are light-transmitting areas that may consist of either light-transmitting areas made from a solid material or orifices in their graticules. The alternate black lines indicated by numbers 43 and 44 between these clear areas are opaque areas to block light from source 10. When the light-transmitting areas 14 and 15 are radially aligned with each other and, as a result, their respective opaque areas 43 and 44, the transducer 13 will receive about 50 percent of the light transmitted from source 10. When the opaque areas of one graticule are radially aligned with the clear areas of the other graticule, practically no light will be transmitted to transducer 13. In the actual graticules used, about 300 clear areas were placed on circular members approximately 2½ inches in diameter. It is preferred to have at least 40 light-transmitting areas per inch as measured perpendicular to the length of the areas. While the upper limit of light-transmitting areas has no fixed value, there is a practical upper limit of about 5,000 light-transmitting areas per inch based on current manufacturing techniques. By using a relatively large light source 10 and transducer 13 as compared to the width of the light-transmitting areas, the need for a precision narrow beam of light is eliminated.

The transducer 13 has a light-sensitive element that may be in a photocell or phototransistor which senses changes in light intensity and converts these changes into electrical serial pulses designated as A in FIG. 1. Thus, transducer 13 acts to quantize the linear motion of the piston rod 5. The number of pulses that equal one revolution of wheel 9 can be easily determined as the radius of the wheel 9 and the graticule 12, which rotates therewith, are both known. Each minute sector of the periphery of the wheel 9 can be equated with an equivalent incremental linear distance along the piston rod 5 which, in turn, can be equated with a volume of fluid in pump 1. For example, if the cross-sectional area Ap of piston 7 is known and constant, by multiplying this area by the distance d piston 7 (and its attached rod 5) moves in its discharge stroke to the left (FIG. 1), the volume of dispensed fluid can be determined, assuming, of course, the pump 1 is completely filled in the volume to the left of the piston 7.

As the intensity of light rays received by transducer 13 varies as graticule 12 rotates, electrical pulse signals A are serially transmitted to a pulse shaper when certain predetermined light intensity levels are exceeded. This would occur as each clear area in graticule 11 alternately aligns itself with a black area and then a clear area in graticule 12. For a specific encoder, the number of A pulses transmitted per second would vary depending on such factors as the rotational speed of the shaft haing wheel 9 and movable graticule 12 thereon and the number of light-transmitting areas 14 and 15 per inch.

Figure 2:
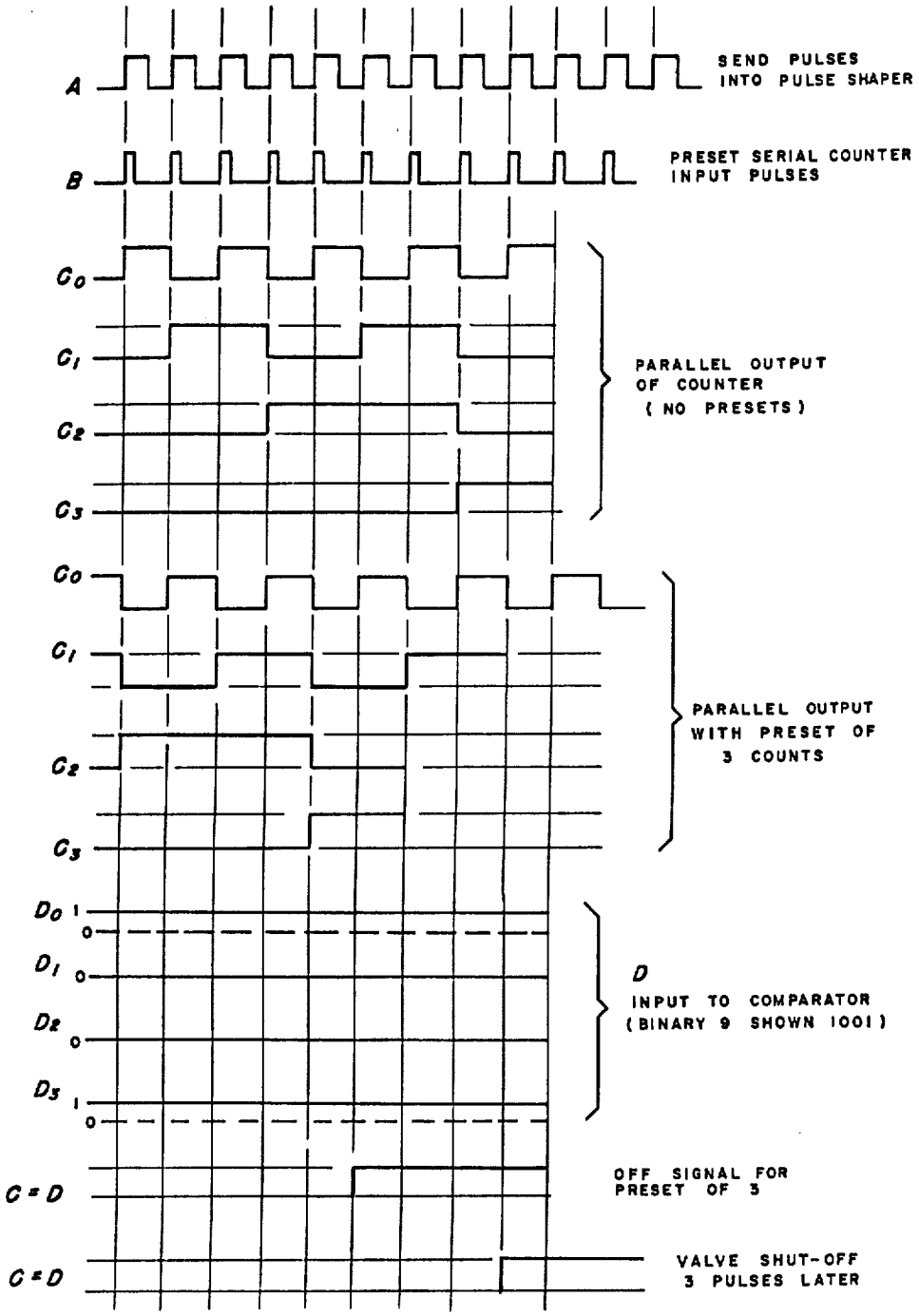
FIG. 2 is a pulse diagram of some of the signals of the circuit elements of FIG. 1.

FIG. 2 is a pulse diagram of the pulses A to D between the different circuit members as shown in FIG. 1. The pulses A and B are serial pulses and the pulses C ($C_0 \ldots C_3$) and D ($D_0 \ldots D_3$) are parallel pulses that may be either parallel binary-coded or parallel binary-coded decimal (BCD) representations. As will be described in more detail hereinafter, the serial electrical signals B are changed to either of the mentioned parallel binary representations within the preset counter. Before this change takes place, pulse A has its leading edge squared by a pulse shaper into pulse B that is not dependent on the piston speed. The actual pulse shaper that my preferred embodiment employs is a Fairchild Semiconductor (division of Fairchild Camera and Instrument Corporation, Mountain View, California, hereinafter referred to as Fairchild) Model 9601, which is a monostable multivibrator that generates a square pulse 1 microsecond in duration. This pulse is shown in FIGS. 1 and 2 as pulse B. FIG. 2 illustrates a pulse diagram of serial pulses A and B, parallel pulses $C_0 \ldots C_3$ with and without preset counts, parallel pulses $D_0 \ldots D_3$ from the programmable instruction, and equality pulse C = D and how it relates to the actual metering shut-off. The first and second set of $C_0 \ldots C_3$ pulses are the same excepting that a three in binary or BCD form has been added to the second set $D_0 \ldots D_3$ show the programmable signal in BCD format when its value is equal to decimal 9 (1001). The C = D equality pulse shows an off signal to the meter memory and how a preset pulse count of 3 actually results in the shut-off valve being turned off at the precise time by compensating for a valve delay of three pulses.

Figure 3:
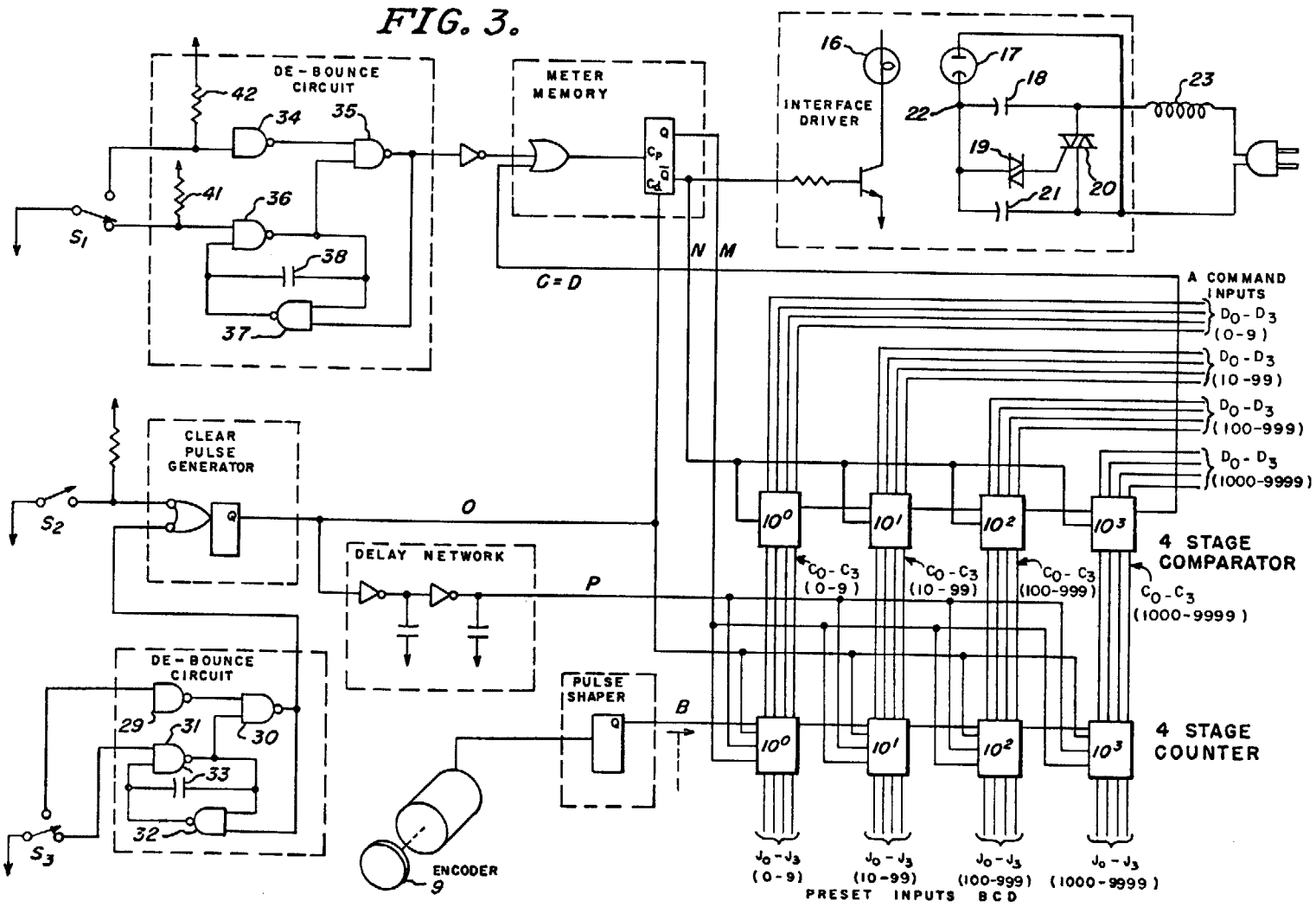
FIG. 3 is a more detailed drawing of the electronic elements making up the basic metering system.

The preset counter received the input J from a valve delay preset and pulse B and outputs pulse C. To illustrate how the counter converts serial pulse B to parallel pulses C in a binary type of system, binary-coded decimal (BCD) format will be described with the understanding that a binary code format could also be used. Further, for purposes of simplicity, the BCD format will be limited to four decimal digits rather than showing a large number. Each of these four decimal digits would correspond to a given set of number $C_0 \ldots C_3$ and $D_0 \ldots D_3$ in FIG. 2 and would have an upper value of 9999. Four Fairchild Models 9310 medium scale integrated (MSI) decade counters could perform this function. The preferred type of counter employed should be able to count serial pulses anywhere from at least 1,000 counts per second up to ten million counts per second. [FIG. 3 shows four sets of $C_0 \ldots C_3$ pulses each entering one of the four MSI's with four wires for each MSI function. As the first serial signal of $C_0$ arrives on one of its four wires, it records either a 0 or 1 in the $10^0$ MSI function of the counter. Thereafter, $C_1$ would record either a 0 or 1 in the same counter and $C_2$ and $C_3$ would perform in the same manner. Depending on the combination of 0's and 1's in the $10^0$ MSI that are recorded, a single decimal digit having a value of 0 to 9 would be represented.] *FIG. 3 shows the serial B pulses entering the $10^0$ MSI stage. As the first serial B signal arrives, it records a 1 in the $10^0$ MSI stage of the counter, and the $C_0$ output line from that counter stage becomes a 1 voltage representation. Thereafter, additional serial B signals will increment the $10^0$ MSI stage and lines $C_1$, $C_2$, and $C_3$ of the $10^0$ MSI stage will become activated to represent a single decimal digit having a value of 0 to 9.* For example, if $C_0 \ldots C_3$ recorded 1001, the decimal digit of 9 would be represented. To record a decimal digit having two integers (10 to 99), the next MSI, $10^1$ function must also be used. Like MSI $10^0$, it can represent only one of the single decimal digits 0 to 9. As is apparent, MSI's $10^2$ and $10^3$ each record only one of the decimal digits as did MSI's $10^0$ and $10^1$. The decimal number 8107 would be recorded as 1000 on MSI $10^3$, 0001 on MSI $10^2$, 0000 on MSI $10^1$, and 0111 on MSI $10^0$, thus, reading in BCD as 1000, 0001, 0000, 0111. Additional stages of MSI's having four binary bits each could be used to obtain higher order decimal numbers above 9999. Thus, MSI $10^4$ would expand the range to 99,999 and MSI $10^5$ to 999,999.

Before the pulses B from the pulse shaper are counted in their respective stages of MSI's in the counter, a preloaded number of counts J in BCD format is inputted to the counter. This preset number of counts is loaded into the counter before the serial B pulses enter. Preset counts are added to take into consideration time lags of the system's operation, such as time lags caused by the four-way solenoid valve operationally associated with hydraulic actuator 10 (FIG. 1) and the delay for the dispensing valve 4. As an example, assume that the meter cylinder 39 delivers a fluid volume equivalent to three pulses due to the valve delays. By presetting the counter to three before metering begins, the comparator will send an off signal via the interface driver three pulses before the desired quantity is delivered. Then the valve delay will cause three more pulse equivalents to be dispensed in its lag time, and the exact amount of desired fluid will be metered. Using the MSI counters, the preset number which can be electrically generated on manual switches or any other BCD output electronic device is set up for entrance with an active low signal on the parallel enable input pulse 0. A minimum set up time for this data is about 30 nanoseconds after which the clock input is strobed by pulse P. To obtain this pulse sequence, a clear pulse 0 is generated from either the manual clear button or the piston retract switch in another monostable multivibrator identical to the pulse shaper (Fairchild Model 9601) which sends its pulse first to the parallel enable input of all four stages, while the same pulse P is delayed in the delay network by about 500 nanoseconds. After being delayed, the pulse P is sent to the clock input of all counter stages to lock the preset number into the counter. As an example, if the preset number is three, a BCD 0000 0000 0000 0011 is preset into the counter, and the first pulse from the pulse shaper will up-count the counter to four.

The actual number n of preset counts that is inputted in a given system is dependent on such factors as the cross-sectional area Ap of piston 7, the radius r of wheel 9, the pulse resolution N, in pulses/radian, the flow rate q out of the dispenser [three] *3* per unit time, and the time interval [(it$_o$ to t$_f$)] *($t_o$ to $t_f$)* it takes to turn off the four-way solenoid valve and valve 4. It can be shown that theoretically:

$$n = \frac{N_e}{A_p} r \int_{t_o}^{t_f} q dt.$$

While n can thus be determined, very sophisticated flow measuring equipment or analytical techniques would be necessary to evaluate the integral. To avoid this complexity and cost, I have developed a two-step experimental technique to determine the number of preset counts.

The first step requires the use of my dispensing and metering system with no preset counts in the counter. Two fluid shots $O_1$ and $O_2$ are dispensed and then measured with one shot being twice that of the other, i.e., $2 O_1 = O_2$. These values are noted and recorded on a graph of the volume of the shots $O_m$ as the Y axis and the values of a constant $K_3$ (where $K_3 = O_m/C_m$) times the actual number of counts $C_m$ as the X axis measurement with [$C_1$] $K_3C_1$ corresponding to volume $O_1$ and [$C_2$] $K_3C_2$ to volume $O_2$. A straight line is then drawn from the $O_1$, $K_3C_1$ point to the $O_2$, $K_3C_2$ point. This line will intersect the $O_m$ (Y axis) axis at a point $O_d$. The next step is to measure $O_d$ which is equal to the volume that [valve delays can be attributed to.] *can be attributed to valve delays.* This volume is converted into counts by $O_d = A_pX_d$ where $X_d$ is the piston displacement or the number of preset counts, $n = N_e/r\ (O_d/A_p)$.

It is important to note that three of the four terms used in my two-step method are constant with $O_d$ being the only variable, $N_e$, the pulse resolution in pulses/radian, would be a characteristic of the sensor and a dimensionless number. Usually in an optical sensor, it would be equal to the number of light-transmitting areas of the graticules and be quite high (over 300). $A_p$ would have cm$^2$ dimension to indicate the area of piston 7.

Knowing the value of r allows an operator to obtain an accurate reading by the sensor and a determination of n. However, in order to accurately determine what dimension r may possess and relate this value to the volume $C_m$, the desired quantity of fluid to be dispensed, the leakage of fluid ($q_L$) in the opposite direction past the piston 7 as it pumps fluid must be considered. Every time piston rod 5 (or piston 7) is displaced a distance $X_p$, the wheel 9 with its radius r rotates through an angular displacement of $\theta$ radians (where $2\pi$ radians = 360°)

$$\theta = 2\pi (X_p/2\pi r) = X_p/r.$$

Converting this to pulses from the encoder ($n_x$) the following is obtained:

$$n_x = N_e\theta = N_e(X_p/r).$$

This would correspond to an actual metered volume, $O_m$, taking into consideration leakage:

[$O_m = A_pX_p = q_L t_s$] $O_m = A_pX_p - q_L t_s$ where $q_L$ is the leakage piston 7 and where $t_s$ (the time for each shot) $t_s = K_1 O_m$ or $$[O_m = (A_pX_p/1 + q_L K_1).]$$

$$O_m = (A_pX_p)/(1 + q_L K_1). \qquad \text{a.}$$

If $q_L$ is assumed to have a constant value with each incremental movement of the piston 7, $O_m$ can be represented by $$[O_m = K_2 X_p \text{ where } K_2 = (A_p/1 + q_L K_1).]$$

$$O_m = K_2 X_p \text{ where } K_2 = A_p/(1 + q_L K_1).$$

To interrelate the symbols, r, $A_p$, $q_L$, and $O_m$, the desired amount of fluid to dispense is arrived at by selecting a command number to represent this volume $C_m$.

$$C_m = N_e(X_p/r) \text{ or}$$

$$[r_e = N_e/C_mX_p]$$

$$r_e = (N_e/C_m) X_p$$

Substituting from equation (a) above, I get:

$$r = [N_e O_m (1 + q_L K_1)/C_m A_p];$$

and since $K_3 C_m = O_m$, $$r = [K_3 N_e (1 + q_L K_1)/A_p]. \qquad \text{b.}$$

In order to compensate for back leakage in the piston, the radius of r is increased from a value $r_1$ (which neglects leakage) to a new value $r_2$ which takes leakage into consideration. To do this, a graph of a plot of the actual volume $O_m$ versus the desired volume $K_3 C_m$ is made. With $q_L$ set to zero in equation (b) Above, $r_1$ is determined. Then two different shots of about double volumes ($O_2 = 2 O_1$) are metered and plotted on the graph and a straight line drawn between their points. By measuring the slope m of this line and using the relationship [$r_2 = 1/m\ r_1$, $r_2$ the increased radius] $r_2 = (1/m)\ r_1$, *the increased radius* $r_2$ may be determined.

It is quite apparent that the back piston leakage $q_L$ and the valve delay errors both occur in an actual metering system and therefore both should be considered together rather than separately. To do this, a graph of the actual volume dispensed $O_m$ (Y axis) is plotted against the desired volume $K_3\ C_m$ (X axis). The value of $r_1$ is calculated from equation (b) and, as was the case in considering leakage by itself, two shots ($O_1$ and $O_2$) are recorded with corresponding desired value $K_3\ C_1$ and $K_3\ C_2$. A straight line from the two points $O_1$, $K_3\ C_1$ and $O_2$, $K_3\ C_2$ can be represented by the general [equation: (c)] *equation (C)* $= O_m = m\ (K_3\ C_m) + O_d$ where m is the line slope and $O_d$ its $O_m$ axis intersection. If the point values are substituted, the slope is:

$$m = [(O_2 - O_1)/K_3\ (C_1 - C_2)]$$

As before, the relationship [$r_2 = 1/m\ r_1$] $r_2 = (1/m)\ r_1$ may be used to obtain:

$$[r_2 = [K_3\ (C_1 - C_2)/O_2 - O_1]\ r_1]$$

$$r_2 = [K_3\ (C_1 - C_2)/(O_2 - O_1)]\ r_1$$

and to also compensate for valve delays, use equation (c) and the m relationship above to get:

$$[O_d = O_1 - [(O_2 - O_1)/K_3\ (C_1 - C_2)]\ (K_3\ C_1)]$$

$$O_d = O_m - [(O_2 - O_1)/K_3\ (C_1 - C_2)]\ (K_3\ C_m)$$

$$[O_d = O_1 - [C_1\ (O_2 - O_1)/(C_1 - C_2)].\ ]$$

$$O_d = O_m - C_m\ [(O_2 - O_1)/(C_1 - C_2)].$$

In pulse notation, the volume $O_d$ would be equivalent to a number of pulses:

$$[n = (\frac{N_e}{r_2})\ [O_1 - \frac{C_1\ (O_2 - O_1)}{A_p\ (C_1 - C_2)}]\ ]$$

$$n = (\frac{N_e}{r_2})\ [\frac{O_m}{A_p} - \frac{C_m (O_2 - O_1)}{A_p (C_1 - C_2)}]$$

This would give you the number of pulses J to put into the preset counter considering both leakage past the piston 7 and the valve delays due to the four-way solenoid valve that operates to control actuating piston 10 and the dispensing valve 4.

The total number of counts received from the [sesnor] *sensor* in any finite time interval is added to the preset counts J and the sum, in BCD or binary format, is [set] *sent* to the comparator as pulses $C_0 \ldots C_3$. FIGS. 1 and 2 illustrate the inputs to the comparator as wires (FIG. 3) and as pulses $C_0 \ldots C_3$ with or without presets. As the name indicates, the comparator compares the C pulses with a programmed number and if the two numbers are equal, generates a signal pulse (C = D) to actuate the solenoid valve. The programmed number may be a fixed predetermined number or, as will be described with reference to FIG. 5, a variable number that is a function of a signal whose value depends on variables outside the heretofore described metering system.

In my preferred embodiment, each of the four Fairchild Model 9324 comparators are connected, one to each [of the C wires,] *group of the* $C_0 - C_3$ *wires,* to the counter's leads with binary input representations. Thus, 16 wires in all are connected to indicate decimal number from 0 to 9999 in BCD format as previously described. When the input C pulses from the counter and the programmable number, also in BCD in my example, are equal, an equality pulse (C = D) is sent to the meter memory to begin the shutoff operation of the metering cylinder. Enabling of the comparator is accomplished with the N signal from the meter memory (FIG. 3). The meter memory consists of a flip flop with toggle input and a reset or clear input. Both the output (O) and the output [compliment] *complement* ($\bar{Q}$) are used. At the time a clear pulse is generated, the O output is set to Zero and the [compliment] *complement* to one. This resetting causes the interface driver to turn the driving piston solenoid four-way valve "off," porting oil to cause the metering piston 7 to retract and fill. A start pulse toggles the output Q to a one and the $\bar{Q}$ to a zero. The one output of the Q enables the preset counters to accept serial count inputs [M] *B*, and simultaneously the Zero of the $\bar{Q}$ output causes the interface driver to activate the driving solenoid valve "on" so that the metering piston 7 moves to dispense metered fluid. At coincidence of the comparator, the equality pulse C = D is sent to an "or" gate input to the meter memory, causing the flip flop to toggle back to the previous state where Q is zero, disabling the counter (by pulse M) and when $\bar{Q}$ is one, turning the driving pump solenoid off. This de-energizing of the solenoid causes the valve to reverse the flow of oil in the driving actuator 10, forcing the metering pump 1 to fully retract. When the metering pump is fully retracted, a limit switch $S_3$ on the member 10 is actuated causing the clear pulse generator to emit a clear pulse O which simultaneously clears and presets the counter and insures that the meter memory is reset.

The interface drive circuit (FIG. 3) is used to change the low voltage DC current in the [memory meter] *meter memory* circuit to high power AC current to actuate the four-way solenoid valve. It also provides high impedance isolation between low voltage logic of the memory, comparator, and counter, and the high voltage of the solenoid actuating AC line. An optical interface as shown in FIG. 3 may be used. The memory output signal can be used to light a lamp 16 when $\bar{Q}$ is a one. This lamp 16 actuates a photocell 17 in a triac gate circuit to trigger the triac off. This triac (bidirection triode thyristor) gate circuit consists of photocell 17, capacitor 18, triac 20, diac 19 (bilateral trigger diode), and disc capacitor 21. With the lamp off, the photocell resistance rises, raising the RC node 22 voltage, causing the diac 19 to conduct, turning the triac 20 on, resulting in AC current flow through the solenoid 23. A small 0.001 microfarad disc capacitor 21 across the photocell reduces the line transient ability to falsely trigger the triac and solenoid.

The basic operation of the FIG. 1 metering system and pulse diagram (FIG. 2) as well as the FIG. 3 circuit diagram should be understood. The first step in the operation of a metering system is to apply electrical power to the control system, and hydraulic power to the fluid system. At the time of turn "on" of the electrical system, the initial conditions of the meter memory and preset counter may be other than a desired start condition, so the depression of the manual clear switch $S_2$ will generate a clear pulse to reset the meter memory, and preset the proper binary-coded decimal number into the preset counter. This prepares the entire system for proper operation. Prior to metering, the command inputs to the comparator are put in by a manual switch, or automatic electronic equipment having a compatible coding system. To meter the commanded volume of material, the start switch $S_1$ is activated, causing the debounce circuit to generate a clean pulse which is sent to the or input of the meter memory. This pulse causes the meter memory to simultaneously enable the preset counter, and via the interface driver, cause the solenoid valve to be activated, porting fluid into the driving cylinder 40 of linear actuator 10, so as to [being] *begin* the metering of fluid. As the driving cylinder 40 pushes the metering piston 7, the transducer wheel 9 rotates the shaft encoder, generating pulses for incremental movements of the metering cylinder 39 of pump 1. The relationship of the number of pulses to a metered quantity is effected by the constant piston area, and the radius of the transducer wheel 9, in combination with the resolution of the black and clear areas on the moving part of the shaft encoder. [the] *The* pulses from *the* shaft encoder are shaped in the pulse shaper, and fed to the preset counter, which changes the serial [pusles] *pulses* into an accumulated parallel BCD format, acceptable to the comparator unit. Since the comparator was enabled at the time the meter memory turned on, the comparator unit is constantly comparing the command inputs against the condition of the preset counter. Initially, the command input magnitude will be greater than that of the preset counter, so that as pulses are added to the counter, an equality between the command and the preset counter numbers will exist.

At the time of that equality, the final stage of the comparator generates a coincidence signal C = D which goes back to the "or" input of the meter memory, resetting it to the off position. This resetting of the meter memory simultaneously disables the counter and comparator and turns the driver piston solenoid valve off, stopping the metering of fluid from the metering cylinder. The solenoid valve's actuation thus controls actuation of the dispensing valve 4 by controlling the movement of the piston rod 5. This is explained by looking at the sequence of events at the time of and immediately after the solenoid valve is shut off to stop the forward movement of piston 7. At the instant the solenoid valve is first actuated by the equality pulse, two oppositely-directed resultant forces are acting on the dispensing ball valve 4. One is the spring biasing force attempting to close the valve and shut off fluid flow and the other is the force of the pressurized fluid being pumped from pump 1. Initially, the latter of these two forces will predominate to cause fluid to be dispensed; however, when the piston 7 stops its forward motion, this force will decrease as fluid is dispensed for a time interval until the spring biasing force predominates to cause the valve 4 to shut off. This delay that compensates for the time it takes valve 4 to shut down after the equality signal actuates the solenoid valve is one of the two valve delays taken into consideration. Because the counter was preset with a number of pulses J equivalent to the dispensing valve and solenoid valve turn-off time, the electrical coincidence occurs that many pulses before the desired amount of material has been metered, but the delay time, in turning the dispensing valve and solenoid off, causes the extra material to be metered, resulting in the desired volume at the output.

Since the solenoid valve has returned to its original position, oil is ported in the opposite direction to the driving cylinder 40, such that it retracts the metering cylinder 39, causing the metering cylinder to refill in preparation for the next shot. At the time the metering cylinder is completely retracted, a manual limit switch $S_3$ is activated by the member 28 on the piston connection shaft, to generate a clear pulse which clears the accumulated number from the preset counter, reloads the valve delay preset number, and simultaneously sends a clear pulse to the meter memory to insure that it is returned to the off condition.

Figure 5:
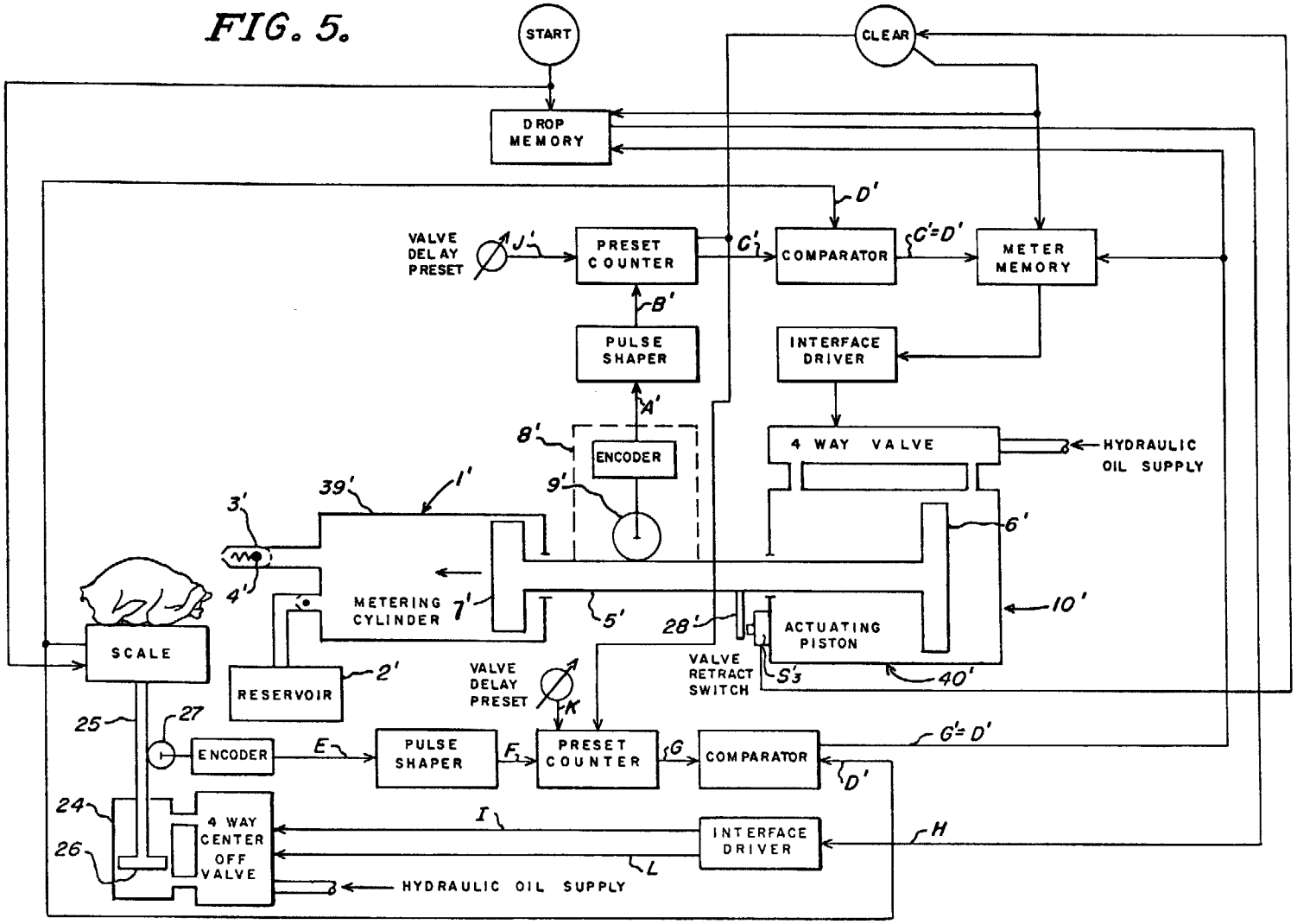
FIG. 5 is a modified system of the preferred embodiment of the metering system.

The fluid dispensed from pump 1 can be under very little or a large amount of pressure and can be used for many purposes. It can be used to fill containers, bottles, or other objects. If under enough pressure (over 100 psi), the fluid dispensed from dispenser 3 can be used without atomizing air to inject objects. In such a case, dispenser 3 would act as an injector. For example, fluid additives or preservatives from reservoir 2 may be injected into objects such as meat or poultry products. This latter use may be accomplished with an airless injection system, to minimize [skir] *skin* breakage and maximize the dispersing of the injected fluid. The object shown in FIG. 5 represents a fowl, such as a turkey, that is being injected with a liquid additive by an injector. The amount of fluid injected is based on the weight of the fowl.

The modification to the previously described system (FIGS. 1–4) that is shown in FIG. 5 has two basic functions that it performs in addition to whatever functions the system of FIG. 1 performs. First, in place of the electronic programmer inputted to the comparator as pulse D, it inputs an input signal D′ that indicates some measurable characteristic of an object external to the fluid metering system. Second, the FIG. 5 system can move the object, like the fowl which is shown, into which fluid is being dispensed or injected relative to the dispenser based upon the same measuring signal D′.

As many of the elements of FIG. 5 are the same as and perform the same functions as the FIG. 1 elements, the same numbers with a prime notation will be used to designate these common elements. For example, 1′ is the positive displacement dispensing pump, 7′ its movable piston, 8′ the sensor, 9′ the encoder wheel, 5′ the piston rod, etc. Similarly, the pulses A, B, C, D, and J have their counterparts A′, B′, C′, D′, and J′ in FIG. 5.

A characteristic measuring device, like the weighing scale of FIG. 5, measures a characteristic of an object, for example, its weight, and sends a signal D′ corresponding thereto to the comparator. The comparator as in the FIG. 1 embodiment, compares this D′ signal with a signal C′ that represents the sum of the counts from the valve delay preset J′ and total pulses B′ from a pulse shaper. The pulse shaper pulses are received from an encoder and wheel 9′ that form a sensor 8′.

When pulse C′ = D′, the memory and interface driver are actuated to shut off the four-way solenoid valve which controls linear actuator 10′. As was described in detail heretofore with respect to the FIG. 1 system, the number of preset counts that is used to partially determine C′ takes into consideration piston leakage (in determining the radius of wheel 9′) as well as the delay time lags for the solenoid valve and dispensing valve 4′.

The other additional function the FIG. 5 system performs is to position the object by using the same measurable characteristic indicating signal D′. In the preferred embodiment, this positioning is accomplished by using a positive displacement single-acting hydraulic linear actuator 24 that has a movable piston rod 25 and a piston 26. A center-off four-way solenoid valve actuates member 24 by hydraulic oil pressure to move the scale that is fixed to piston rod 25 in a vertical direction. An optical sensor comprising a wheel 27 and encoder functions like the sensors 8 and 8' of FIGS. 1 and 5 to sense the movement of piston rod 25 and thereby control the associated solenoid valve.

Many of the circuit elements which perform the positioning function of FIG. 5 are very similar to their metering counterparts in FIG. 1. By placing an object on the scale, a load cell is actuated that results in a BCD signal D' being sent to both of the comparators shown. This signal may be directly related to the weight of the object or any fixed percentage of its weight through proper scaling of the sensor wheel radius. In one working embodiment, the signal D' indicates a percentage of the weight of a fowl that is to be injected with a food additive. If the circuit has been set in operation by pressing the start button, the solenoid valve will lower the object into which fluid will be dispensed. As piston 25 makes incremental vertical movements, the encoder wheel 27 rotates. The encoder sends a signal E to its pulse shaper which, in turn, transmits a shaped signal F. The signal pulses from E and F are thus representative of incremental movements of piston rod 25. A preset counter then sums the preset counts K and total number of F signal counts in a finite time interval and generates a pulse G. The comparator compares pulses G and D' and, if equal, generates an equality pulse which resets the drop memory turning off the solenoid valve by signal H to the interface driver circuit and signal 1 to the valve. When the solenoid valve is turned off, hydraulic actuator 24 and its rod 25 do not move which results in the object being fixed in position relative to the dispenser 3'.

Once the drop memory has deactivated the interface driver by signal H, the meter memory of the metering system, which is the counterpart to the FIG. 1 embodiment, is activated to cause its interface driver to actuate the solenoid valve of actuating piston 6'. Fluid is then dispensed by dispenser 3' in response to the movement of piston rod 5'. The sensor 8' senses this movement and sends serial pulses A' to the pulse shaper which generates serial pulses B' that are sent to the preset counter. As was the case in the FIG. 1 embodiment, the counter adds a valve delay compensating count J' to the total number of B' counts and converts the sum to binary notation — here BCD. Signal C' represents this [parellel] *parallel* binary pulse which is sent to the comparator. The comparator examines the pulses C' and the pulses D', representing in BCD format a measurable characteristic (weight) of the object, and if there is coincidence, the meter memory is activated. This causes the interface driver circuit and four-way solenoid valve to be shut off. When the solenoid valve of hydraulic linear actuator 10' is shut off, the piston rod 5' moves to the right in FIG. 5. This movement is caused by the movement of the solenoid valve that now places greater pressure on the left face of piston 6'. A limiting switch $S_3'$ is activated when it is tripped by a member 28' rigidly attached to the piston rod. This activation clears the preset counters of the metering and position circuits and the meter memory and drop memory via the interface driver and pulse L and actuator 24 piston extends to the start position to set the entire system up for a new sequence of operation. The FIG. 1 counter parts would perform in a similar manner except that when member 28 causes switch $S_3$ to be actuated, only the preset counter and the meter memory would be cleared.

One of the circuits, useable in both the FIG. 1 and FIG. 5 embodiments, is the input de-bounce circuit. Two of these circuits are shown in FIG. 3. Each consists of four nand gates, two [pull] *pull-up* resistors 41 and 42, and a capacitor. The nand gates are designated by the numbers 29 to 32 and 34 and 37, inclusive and the capacitors by numbers 33 and 38. The function of these circuits is to smooth out electrical transitions inputted to the logic system to prevent the sensitive logic circuits from being activated from each variation in the input voltage due to the switch contact bounce from switches $S_1$ and $S_3$. They act to generate one pulse during the time of initial variation so that the meter memory and other circuit elements are actuated only once and not during each input pulse variation.

The particular circuit elements may, of course, be varied without departing from the basic concepts of my invention. Changes may also be made in the sensor including the optical sensor that was described or the type of circuit logic used as well as the type of pump employed. Further, the type of measuring apparatus need not be a scale to weigh an object as shown in FIG. 5. It could be a device that measures the dimensions of an object, or its density, or its color or any other measurable character or combination thereof. None of these changes should be used to limit or otherwise restrict the scope of my invention which is set forth in the following claims.

I claim:

1. A fluid metering system comprising:

a positive displacement pump having a movable *and reciprocable* piston;

a high resolution sensing means for sensing piston movement during a finite time interval and sending a series of first electrical signals in response to said movement;

a preset counting means operatively associated with said sensing means to receive and count the number of first signals in said time interval and add to them a preset number of counts to obtain a total;

a comparator means for receiving and comparing the total signals in said counter means with a programmable number and emitting a second electrical signal when their values are equal; and means to control piston movement in response to said second signal from said comparator; and a dispensing means with a valve, operatively associated with said control means and pump for dispensing a predetermined volume of fluid in response to said control means.

2. The system of claim 1 wherein said sensing means comprises a light-sensitive element to sense linear movement of said piston.

3. The system of claim 1 wherein said first electrical serial signals are changed to parallel binary-coded numbers within said counting means; and said preset number is also binary-coded and has its value determined by taking into consideration time lags that occur during the system operation.

4. The system of claim 1 wherein said dispensing valve is a normally closed valve and said preset counter value takes into consideration the time lag caused by said valve operation by adding a time equivalent number of signals to the signal number which corresponds to the total number of first signals emitted by said sensing device.

5. The system claim 1 claim wherein said first electrical serial signals are changed to parallel binary-coded decimal numbers within said counting means; and said preset number is also binary-coded decimal numbers and has its value determined by taking into consideration time lags that occur during the system operation.

6. The system of claim 1 wherein the sensing means comprises:

a light-sensitive transducer to receive light rays and convert them to electrical signals;

a digital position sensor movable with said piston movement and having a plurality of equally-spaced light-transmitting areas; and a source of light to transmit light rays through said digital sensor to said transducer to cause said first signals to be emitted seriatim as light rays are transmitted through said areas.

7. The system of claim 6 wherein there are at least 40 light-transmitting areas per inch.

8. The system of claim 1 wherein said high resolution sensing means can sense piston incremental movements of less than 0.1 inch and said preset counting means can count at least 1000 counts per second.

9. The system of claim 1 wherein said control means comprises a solenoid actuated valve.

10. A fluid metering system comprising:

a characteristic measuring apparatus with means to indicate a measurable characteristic of an object of sending an electrical-indicating signal corresponding thereto;

a positive displacement pump having a movable piston;

a high resolution sensing means for sensing piston movement during a finite time interval and sending a series of first electrical signals in response to said movement;

a preset counting means operatively associated with said sensing means to receive and count the number of first signals in said time interval and add to said total number of first signals a preset number of counts to obtain a total;

a comparator means for receiving and comparing the total number of signals in said counter means with said electrical-indicating signal and emitting a second electrical signal when their values are equal; means to control piston movement in response to said second signal from said comparator; and a dispensing means with a valve, operatively associated with said control means and pump for dispensing a predetermined volume of fluid in response to said control means.

11. The system of claim 10 wherein said characteristic measuring apparatus is a scale and said electrical indicating signal corresponds to the weight of an object on said scale.

12. The system of claim 10 wherein said sensing means comprises a light-sensitive element to sense linear movement of said piston.

13. The system of claim 10 wherein said first electrical serial signals are changed to parallel binary-coded numbers within said counting means; and said preset number is also binary-coded and has its value determined by taking into consideration time lags that occur during the system operation.

14. The system of claim 10 wherein said dispensing valve is a normally closed valve and said preset counter value takes into consideration the time lag caused by said valve operation by adding a time equivalent number of signals to the signal number which corresponds to the total number of first signals emitted by said sensing device.

15. The system of claim 10 wherein said first electrical serial signals are changed to parallel binary-coded decimal numbers within said counting means; and said preset number is also binary-coded decimal numbers and has its value determined by taking into consideration time lags that occur during the system operation.

16. The system of claim 10 wherein the sensing means comprises:

a light-sensitive transducer to receive light rays and convert them to electrical signals;

a digital position sensor movable with said piston movement and having a plurality of equally-spaced light-transmitting areas; and a source of light to transmit light rays through said digital sensor to said transducer to cause said first signals to be emitted seriatim as light rays are transmitted through said areas.

17. The system of claim 16 wherein there are at least 40 light-transmitting areas per inch.

18. The system of claim 10 wherein said highly resolution sensing means can sense piston incremental movements of less than 0.1 inch and said preset counting means can count at least 1000 counts per second.

19. The system of claim 10 including means to position said object with respect to said dispensing means based upon said indicating signal.

20. The system of claim 11 wherein the object on said scale is a fowl to be injected with liquid additive, in which said dispensing means is an injector, and in which said system is employed to control the amount of liquid additive injected into the fowl in accordance with the weight of the fowl.

21. The system of claim 20 including means to position the fowl with respect to the injector based upon said indicating signal.

22. The system of claim 10 wherein said control means comprises a solenoid actuated valve.

23. A method of operating a fluid-metering system comprising the step of:

sensing incremental movement of a positive displacement pump piston and coverting said movement into electrical serial pulses;

counting the number of serial pulses received during a finite time interval and adding to this total a preset number of counts to compensate for delays within the system;

comparing the total number of serial and preset counts with a programmable number and generating an equality pulse if they are equal; and

[acutating] *actuating* a valve within a dispensing means in response to said equality pulse.

24. The method of claim 23 including the step of converting the total number of serial pulses and preset counts into a binary-coded number before the comparing step.

25. The method of claim 23 including the step of converting the total number of serial pulses and preset counts into a binary-coded decimal number before the comparing step.

26. The method of claim 23 including the step of measuring a characteristic of an object and generating an electrical pulse in response thereto to act as the programmable number.

27. The method of claim 26 including the step of positioning an object relative to a dispenser outlet in response to the same electrical pulse generated by the measuring characteristic step.

28. The method of claim 23 wherein the sensing step includes the step of moving a light-transmitting area relative to a light-sensitive transducer to obtain said electrical serial pulses.

* * * * *